(12) United States Patent
Havinis et al.

(10) Patent No.: US 6,216,007 B1
(45) Date of Patent: Apr. 10, 2001

(54) PREVENTION OF ALTERATION OF LOCATION INFORMATION FOR MOBILE-BASED LOCATION CALCULATION

(75) Inventors: Theodore Havinis, Plano; David Boltz, Garland, both of TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/163,028

(22) Filed: Sep. 29, 1998

(51) Int. Cl.⁷ ..................................................... H04Q 7/00
(52) U.S. Cl. ........................ 455/456; 455/457; 455/550; 455/558; 455/410; 342/457
(58) Field of Search .................... 455/408, 410, 455/411, 456, 550, 558, 575, 556, 457; 380/49, 21, 28; 342/457, 357.06

(56) References Cited

U.S. PATENT DOCUMENTS

| | | | |
|---|---|---|---|
| 5,317,323 | * | 5/1994 | Kennedy et al. ..................... 342/457 |
| 5,388,147 | | 2/1995 | Grimes .................................... 379/59 |
| 5,577,122 | * | 11/1996 | Schipper et al. ....................... 380/28 |
| 5,774,802 | * | 6/1998 | Tell et al. .............................. 455/408 |
| 5,790,073 | * | 8/1998 | Tayloe et al. ................... 342/357.16 |
| 5,815,114 | * | 9/1998 | Speasl et al. .................. 342/357.06 |
| 5,825,889 | * | 10/1998 | Dent ....................................... 380/49 |
| 5,841,873 | * | 11/1998 | Lockart et al. ........................ 380/49 |
| 5,889,861 | * | 3/1999 | Ohashi et al. .......................... 380/21 |
| 5,898,391 | * | 4/1999 | Jefferies et al. ...................... 340/988 |
| 6,011,973 | * | 1/2000 | Valentine et al. .................... 455/456 |

FOREIGN PATENT DOCUMENTS

WO 95/21511   8/1995   (WO).

OTHER PUBLICATIONS

PCT International Search Report dated Feb. 4, 2000.

* cited by examiner

Primary Examiner—Lee Nguyen
Assistant Examiner—Simon Nguyen
(74) Attorney, Agent, or Firm—Jenkens & Gilchrist, P.C.

(57) ABSTRACT

A telecommunications system and method is disclosed for minimizing the chances of a mobile subscriber altering the calculated location of an associated mobile terminal when the positioning measurements and location calculation are performed by the mobile terminal. In order to prevent tampering with the location information, the Positioning Measurement Module (PMM) can be separated from the Location Calculation Module (LCM) by including both the LCM and topological information used for calculation of the location of the mobile terminal on a smart integrated circuit (IC) card within the mobile terminal. When the PMM obtains positioning measurement information, this positioning information is encrypted and sent to the LCM within the smart card, which then deciphers the encrypted information and uses the positioning information and stored topological information to calculate the location of the mobile terminal.

37 Claims, 2 Drawing Sheets

PREVENTION OF ALTERATION OF LOCATION INFORMATION FOR MOBILE-BASED LOCATION CALCULATION

BACKGROUND OF THE PRESENT INVENTION

1. Field of the Invention

The present invention relates generally to telecommunications systems and methods for determining the location of a mobile terminal within a cellular network, and specifically to preventing the alteration of location information for mobile terminal-based location calculation methods.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

MS-based location calculation methods have recently been developed whereby BTS 24 coordinates and other location information are transmitted to the MS 20 for calculation of the location of the MS 20. The MS 20 can then forward its location to a network location application that requested the positioning of the MS 20 or can use its determined location along with internal location applications to display the location information to the mobile subscriber.

For example, the MS 20 can have a Global Positioning System (GPS) receiver built into it, which is used to collect location information in order to allow the MS 200 to calculate its location. In addition, the MS 20 can collect positioning data based on the Observed Time Difference (OTD) between the time a BTS 24 sends out a signal and the time the MS 20 receives the signal. This time difference information can then be used by the MS 20 for calculation of the location of the MS 20.

By using Enhanced-OTD or GPS positioning methods with MS-based location calculation, it becomes unnecessary to have active two-way communication between the MS 20 and the network 14, which increases the signaling capacity of the network 14, and allows the MS 20 to perform location calculation while the MS 20 is in idle-mode. The implementation of MS-based location calculation is therefore expected to trigger a number of additional location applications, such as home zone charging, in which the price for using the voice or signaling channels can be dependent on the geographical location of the MS 20. However, when the MS 20 is responsible for calculating its position rather than the network, the system becomes volatile to fraud. For example, a mobile subscriber may be able to alter the real calculated location in order to apply a different (cheaper) tariff when using the voice or signaling channels.

It is, therefore, an object of the present invention to prevent the alteration of location information by the mobile subscriber when utilizing mobile terminal-based location calculation mechanisms.

SUMMARY OF THE INVENTION

The present invention is directed to telecommunications systems and methods for minimizing the chances of mobile subscriber fraudulently calculating the location of an associated mobile terminal when the positioning measurements and location calculation are performed by the mobile terminal. Mobile-based E-OTD (or GPS) location calculation methods allow the mobile terminal to calculate its own location in idle or dedicated mode based upon positioning measurements obtained by the mobile terminal, additional information supplied by the network and a location calculation function within the mobile terminal. Specifically, the location calculation can be carried out by utilizing a Positioning Measurement Module (PMM) within the mobile terminal for performing the positioning measurements and a Location Calculation Module (LCM) within the mobile terminal for converting the positioning measurements to location information. In order to prevent tampering with the location information, the PMM, which will always be embedded on the mobile terminal, is separated from the LCM by including the LCM on a smart IC card, such as a SIM card, within the mobile terminal. The smart IC card can contain a Read Only Memory (ROM) for storing application specific data, such as BTS coordinates and a PROM for storing the LCM application code. When the PMM obtains positioning measurement information, this information is encrypted and sent to the LCM, which then deciphers the encrypted information and uses the information to calculate the mobile terminal location. The location information can then be ciphered again with a ciphering algorithm before being passed to either a transceiver (TRX) unit within the mobile terminal for transmission to the network or a location application (LA) internal to the mobile terminal.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
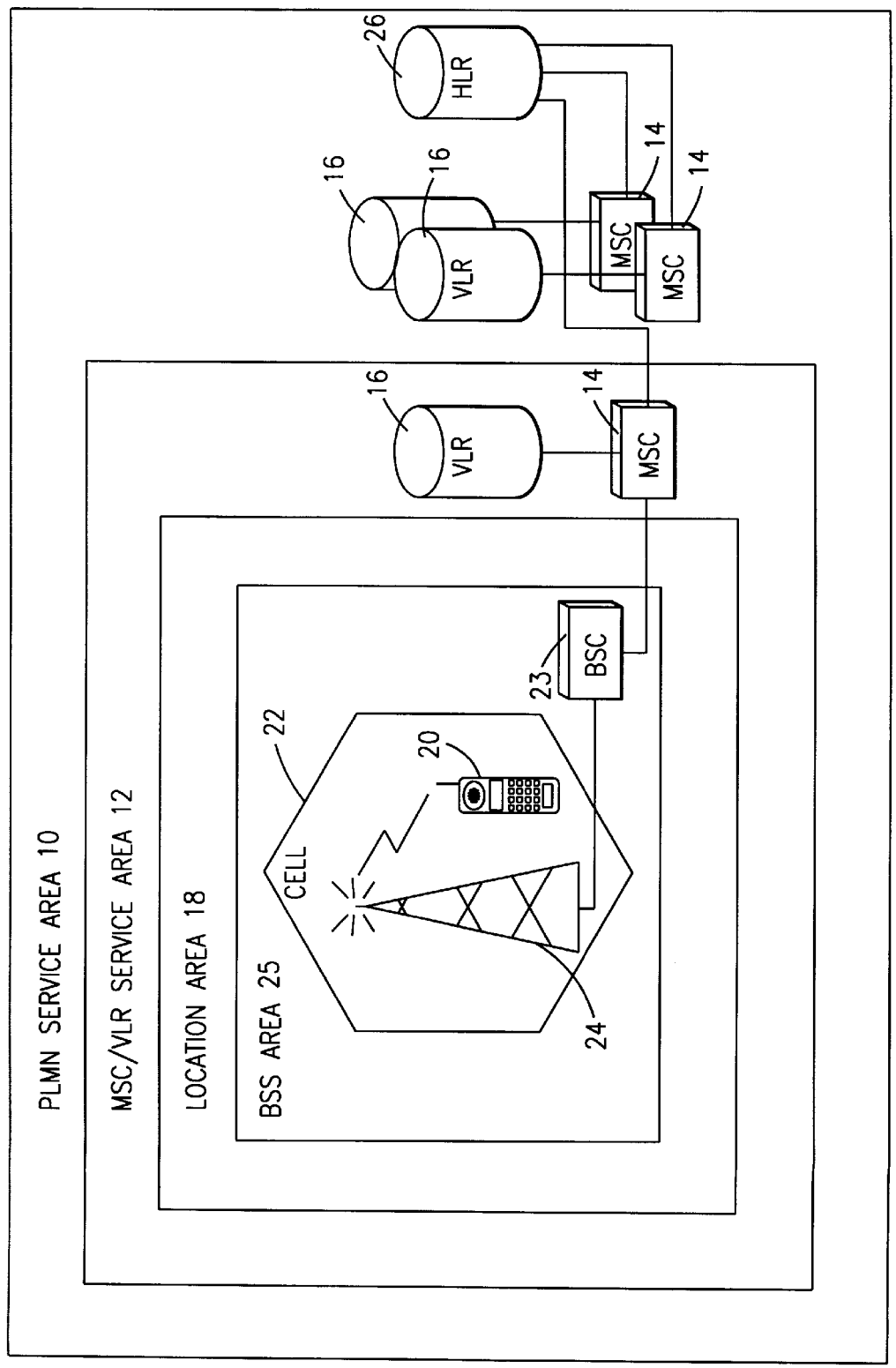
FIG. 1 is a block diagram of a convention wireless telecommunications system.
Figure 2:
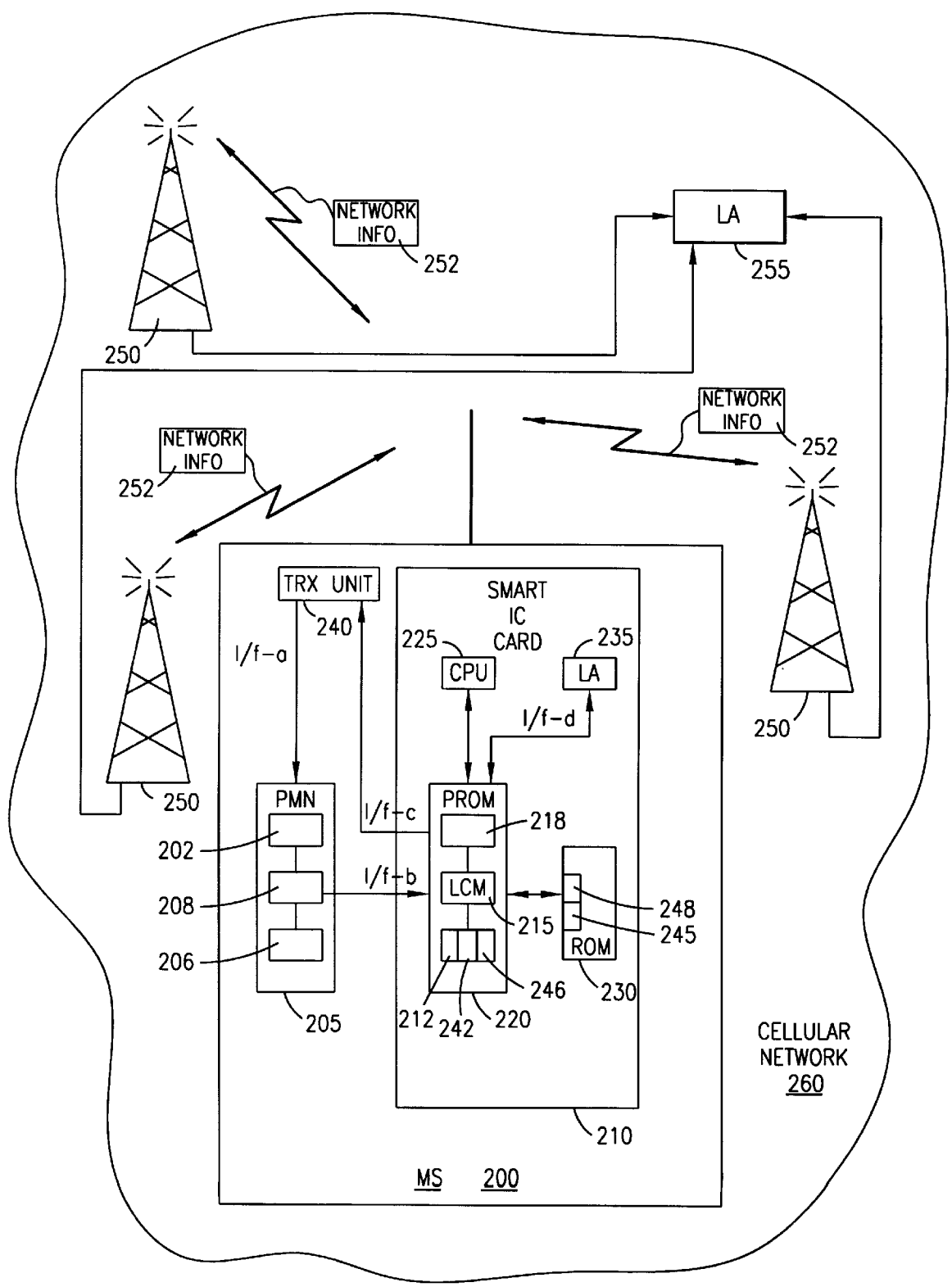
FIG. 2 shows a mobile terminal-based location calculation system in which the location calculation function is separated from the positioning measurement function in order to prevent tampering with the location calculation information.

With reference now to FIG. 2 of the drawings, a mechanism is shown to minimize the chances of fraudulent calculations of the location of a Mobile Station (MS) 200 by a mobile subscriber when the positioning measurements and location calculation are performed by the MS 200. Mobile-based Enhanced Observed Time Difference (E-OTD) or Global Positioning System (GPS) location calculation methods can be implemented so that a cellular network 260 serving the MS 200 sends to the MS 200 positioning measurement information 208 along with other necessary information, depending on the positioning method used, regardless of the location of the MS 200. The MS 200 can then calculate its own location in idle or dedicated mode based upon its own positioning measurements 208, additional information supplied by the network 260 and a location calculation function within the MS 200. Specifically, the location calculation can be carried out by utilizing both a Positioning Measurement Module (PMM) 205 within the MS 200 for performing the positioning measurements 208 with the aid of information 252 from the network 260 and an algorithm 202 specific to the positioning method used and a Location Calculation Module (LCM) 215 within the MS 200 for converting the positioning measurements 208 to location information 218 with the aid of topological information 248 and an algorithm 212 for performing the conversion.

By introducing a smart IC card 210, such as a Subscriber Identity Module (SIM) card, in the MS 200 that separates the PMM 205 from the LCM 215 and includes both the LCM 215 and application specific data 248, the chances that the mobile subscriber can alter the calculated location information 218 are reduced. In order for the smart IC card 210 to perform location calculation in a secure way, the smart IC card 210 can contain a Read Only Memory (ROM) 230 for storing the application specific data 248, such as the coordinates of relevant Base Transceiver Stations (BTSs) 250 (or base stations), and a PROM 220 for storing the LCM 215 and application code 212 for the LCM 215.

If the BTS coordinate information 248 is instead broadcast to the MS 200 periodically, as is conventionally done, a mobile subscriber may be able to manipulate the BTS coordinate information 248 in order to alter the calculated location information 218. However, by permanently storing the BTS coordinate information 248 on the smart card 210, the ability of a mobile subscriber to alter the calculated location information 218 is diminished because the BTS coordinate information 248 cannot be altered. It should be noted that the BTS coordinate information 248 may need to be updated from time to time due to the installation of new BTS 250 sites or removal of old BTS 250 sites. Therefore, the smart IC card 210 can be programmed to prevent additional mobile-based location calculation positionings of the MS 200 after a certain elapsed period of time until the mobile subscriber inserts a new smart IC card 210 with the updated BTS coordinate information 248.

When the PMM 205 obtains the positioning measurement information 208 with the aid of information 252 from the network 260, e.g., the observed time difference between the time a particular one of the BTSs 250 sends out a signal and the time the MS 200 receives the signal, which is sent over interface I/f-a from a Transceiver (TRX) unit 240 that receives the information from the surrounding BTS's 250, and with the aid of an algorithm 202 specific to the positioning method used, the PMM 205 preferably encrypts the positioning measurement information 208, using a standardized ciphering algorithm 206, and sends the encrypted positioning measurement information 208 to the LCM 215 within the PROM 220 in the smart card 210 over interface I/f-b. The encryption of the positioning measurement information 208 further reduces the chances that a mobile subscriber can alter the calculated location information 218. The LCM 215 can then decipher the encrypted information 208 using a deciphering key 245 and calculate the location 218, e.g., X,Y coordinates, of the MS 200 using the positioning measurement information 208 as well as topological information 248, e.g., BTS coordinates 248 provided by the ROM 230, and an algorithm 212 for performing the conversion stored within the PROM 220. The deciphering key 245 can be stored on either the ROM 230 or PROM 220, the former being illustrated.

Once the LCM 215 calculates the location information 218, the LCM 215 preferably encrypts the calculated location information 218 with a ciphering algorithm 242, which can be the same algorithm 206 used to encrypt the positioning measurement information 208 or can be another algorithm 242, before passing the location information 218 to either the TRX unit 240 over interface I/f-c for transmission to a Location Application (LA) 255 within the network 260 or an internal LA 235 over interface I/f-d. It should be understood that during transmission to the network 260, the ciphering algorithm 242 can calculate a time-differentiating deciphering key 246, which the network 260 can recognize and decipher before passing the deciphered location information 218 onto the LA 255. For example, the ciphering algorithm 242 can generate a new deciphering key 246 every minute, which is in sync with the deciphering key (not shown) stored in the network 260.

In addition, the smart IC card 215 preferably contains a central processing unit (CPU) 225 for controlling the flow of information between the PROM 220, ROM 230, PMM 205, TRX unit 240 and any internal LA 235. By separating the functionality of the PMM 205 from the functionality of the LCM 215, it becomes more difficult for a mobile subscriber to alter the calculated location of the MS 200. In addition, by encrypting all of the information flowing between the PMM 205, LCM 215, LA 235 and TRX unit 240, the chances that a mobile subscriber could successfully tamper with any of the information are reduced.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A mobile terminal for minimizing fraudulent calculations of the location of said mobile terminal within a cellular network, comprising:
   a positioning measurement module for obtaining positioning information associated with the location of said mobile terminal; and
   a smart card having a location calculation module and topological information stored therein, said positioning measurement module not being within said smart card, said location calculation module being operatively connected to said positioning measurement module for calculation of location information for said mobile terminal within said cellular network using said positioning information provided by said positioning measurement module and said topological information.

2. The mobile terminal of claim 1, wherein said positioning measurement module encrypts said positioning information with a ciphering algorithm and sends said encrypted positioning information to said location calculation module.

3. The mobile terminal of claim 2, wherein said location calculation module deciphers said positioning information before calculating said location information.

4. The mobile terminal of claim 3, wherein said smart card further comprises a memory for storing said location calculation module, said memory containing a deciphering key for said encrypted positioning information, said location calculation module using said deciphering key to decipher said positioning information.

5. The mobile terminal of claim 4, wherein said memory is a PROM.

6. The mobile terminal of claim 3, wherein said smart card further comprises a memory connected to said location calculation module, said memory containing a deciphering key for said encrypted positioning information, said location calculation module using said deciphering key in deciphering said positioning information.

7. The mobile terminal of claim 1, wherein said smart card further comprises a memory connected to said location calculation module for storing said topological information.

8. The mobile terminal of claim 7, wherein said memory is a Read Only Memory.

9. The mobile terminal of claim 1, further comprising a transceiver unit connected to said positioning measurement module for receiving, from said cellular network, network information used by said positioning measurement module to obtain said positioning information.

10. The mobile terminal of claim 9, wherein said transceiver unit transmits said location information generated by said location calculation module to a location application within said cellular network.

11. The mobile terminal of claim 10, wherein said location calculation module encrypts said location information with a ciphering algorithm and sends said encrypted location information to said transceiver unit to transmit to said location application within said cellular network via said cellular network.

12. The mobile terminal of claim 11, wherein said ciphering algorithm calculates a time-differentiating deciphering key recognizable by said cellular network, said cellular network using said time-differentiating deciphering key to decipher said location information, said cellular network sending said deciphered location information to said location application within said cellular network.

13. The mobile terminal of claim 1, wherein said smart card further comprises an internal location application connected to said location calculation module, said location calculation module sending said location information to said internal location application.

14. The mobile terminal of claim 13, wherein said location calculation module encrypts said location information with a ciphering algorithm and sends said encrypted location information to said internal location application.

15. The mobile terminal of claim 1, wherein said smart card further comprises a central processing unit connected to said location calculation module for controlling the sending of said positioning information to said location calculation module and the calculation of said location information by said location calculation module.

16. The mobile terminal of claim 1, wherein said smart card comprises a Subscriber Identity Module.

17. The mobile terminal of claim 1, wherein said location information comprises X, Y coordinates.

18. The mobile terminal of claim 1, wherein said location calculation module calculates said location information using an Enhanced Observed Time Difference positioning method.

19. The mobile terminal of claim 1, wherein said location calculation module calculates said location information using a Global Positioning System positioning method.

20. A telecommunications system for minimizing fraudulent calculations by mobile terminals of the location of said mobile terminals within a cellular network, said telecommunications system comprising:
   at least one base station within said cellular network; and
   a given one of said mobile terminals in wireless communication with said base station, said given mobile terminal having:

a positioning measurement module for obtaining positioning information associated with the location of said given mobile terminal, and a smart card having a location calculation module and topological information stored therein, said positioning measurement module not being within said smart card, said location calculation module being operatively connected to said positioning measurement module for calculation of location information for said mobile terminal within said cellular network using said positioning information provided by said positioning measurement module and said topological information.

21. The telecommunications system of claim 20, wherein said positioning measurement module encrypts said positioning information using a ciphering algorithm and sends said encrypted positioning information to said location calculation module.

22. The telecommunications system of claim 20, wherein said smart card further comprises a memory for storing said location calculation module.

23. The telecommunications system of claim 20, wherein said smart card further comprises a memory connected to said location calculation module for storing said topological information.

24. The telecommunications system of claim 20, wherein said given mobile terminal further comprises a transceiver unit connected to said positioning measurement module for receiving, from said cellular network, network information used by positioning measurement module to obtain said positioning information.

25. The telecommunications system of claim 24, wherein said transceiver unit transmits said location information generated by said location calculation module to a location application within said cellular network via said at least one base station.

26. The telecommunications system of claim 25, wherein said location calculation module encrypts said location information using a ciphering algorithm and sends said encrypted location information to said transceiver unit to transmit to said location application within said cellular network via said cellular network.

27. The telecommunications system of claim 26, wherein said ciphering algorithm calculates a time-differentiating deciphering key recognizable by said cellular network, said cellular network using said time-differentiating deciphering key to decipher said location information, said cellular network sending said deciphered location information to said location application within said cellular network.

28. The telecommunications system of claim 20, wherein said smart card is a Subscriber Identity Module.

29. A method for minimizing fraudulent calculations by a mobile terminal of the location of said mobile terminal within a cellular network, said method comprising the steps of:

storing topological information within a smart card within said mobile terminal;

obtaining positioning information associated with the location of said mobile terminal using a positioning measurement module within said mobile terminal;

sending said positioning information to a location calculation module within said smart card, said positioning measurement module not being within said smart card; and calculating location information for said mobile terminal within said cellular network using said positioning information and said topological information by said location calculation module.

30. The method of claim 29, further comprising the step of:

encrypting, by said positioning measurement module, said positioning information before said step of sending said encrypted positioning information to said location calculation module.

31. The method of claim 29, further comprising the step of:

deciphering, by said location calculation module, said positioning information.

32. The method of claim 29, wherein said step of storing further comprises the step of storing said topological information within a memory in said smart card, said memory being connected to said location calculation module.

33. The method of claim 29, further comprising the step of:

receiving network information from said cellular network using a transceiver unit, said step of obtaining further comprising the step of obtaining said positioning information using said network information and an algorithm stored within said positioning measurement module.

34. The method of claim 33, further comprising the step of:

transmitting, by said transceiver unit, said location information to a location application within said cellular network via said cellular network.

35. The method of claim 34, further comprising the steps of:

encrypting, by said location calculation module, said location information using a ciphering algorithm; and sending said encrypted location information to said transceiver unit.

36. The method of claim 35, further comprising the step of:

calculating, by said ciphering algorithm, a time-differentiating deciphering key recognizable by said cellular network, said step of transmitting further comprising the steps of: deciphering, by said cellular network, said encrypted location information using said time-differentiating deciphering key, and sending said deciphered location information from said cellular network to said location application within said cellular network.

37. The method of claim 29, further comprising the step of:

encrypting, by said location calculation module, said location information; and sending said encrypted location information to an internal location application within said smart card.

* * * * *